O. J. COOPER.
MOTION PICTURE CAMERA FOR COLOR PHOTOGRAPHY.
APPLICATION FILED JULY 11, 1917.
1,269,391.
Patented June 11, 1918.
2 SHEETS—SHEET 2.
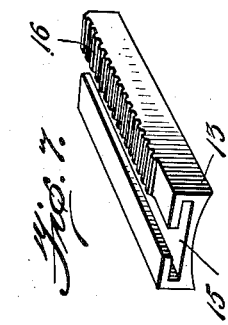
Fig. 7.
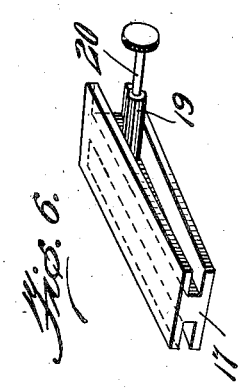
Fig. 6.
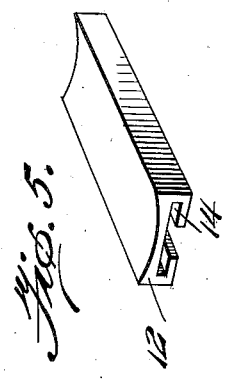
Fig. 5.
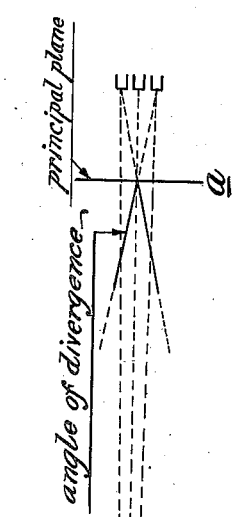
Fig. 9.
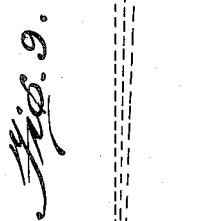
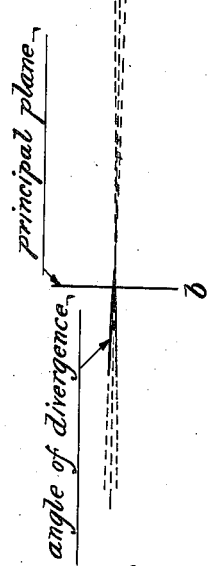
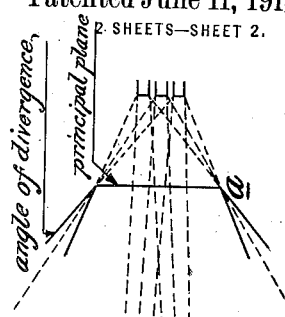
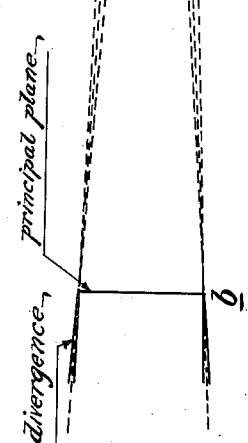
Fig. 10.
Inventor
Orange J. Cooper
By
Attorneys

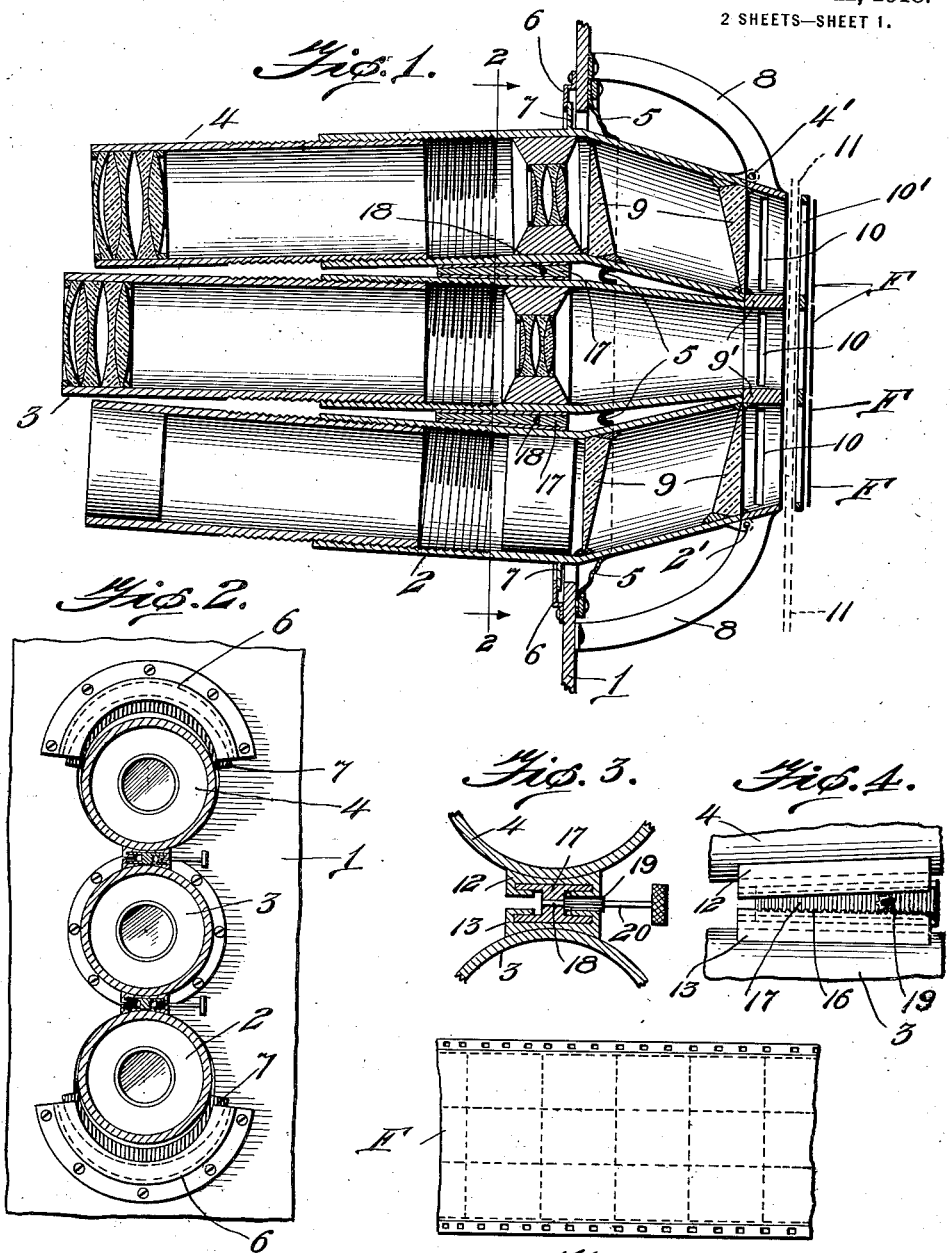

UNITED STATES PATENT OFFICE.

ORANGE J. COOPER, OF LAMAR, COLORADO.

MOTION-PICTURE CAMERA FOR COLOR PHOTOGRAPHY.

1,269,391.   Specification of Letters Patent.   Patented June 11, 1918.

Application filed July 11, 1917. Serial No. 179,861.

*To all whom it may concern:*

Be it known that I, ORANGE J. COOPER, a citizen of the United States, residing at Lamar, in the county of Prowers and State of Colorado, have invented certain new and useful Improvements in Motion-Picture Cameras for Color Photography; and I do hereby declare the following to be a full, clear, and exact description of the invention, such as will enable others skilled in the art to which it appertains to make and use the same.

This invention relates to an arrangement of photographic lenses for motion pictures and other cameras for the simultaneous photographing or producing of a plurality of negatives upon one film preferably in vertical axial order; said multiple negatives covering to all practical purpose in color photography, identical fields both at the point of the principal plane and in perspective. The invention relates more particularly to the novel means for practically correcting the focal divergence or diffusion which occurs in planes beyond that of the principal object or objects.

In order to control and neutralize the variation in velocity of the light waves of the three primary colors it is necessary that each of the three images reaching and acting upon the film through the color screens or ray filters be introduced into the camera through independent lenses in which the control is obtained by the manipulation of diaphragms and by varying the density of the screens employed. Hitherto this method has not succeeded for two reasons: viz, the impossibility in the practical projection of synchronizing three independent films and more especially on account of the very great focal diffusion or divergence beyond the plane of the principal object.

The present invention has for its purpose the practical elimination of these defects. The first is accomplished by placing the three negatives in vertical axial order upon a single film, whose width is commercially convenient, thus rendering synchronism automatic and the second by the use of three telephoto lenses superimposed in a vertical plane. And there is also provided means to adjust the upper and lower lenses in this vertical plane to and from the central lens, which adjustment is of course in addition to the usual individual adjustments provided for each telephoto lens.

A further object of the invention resides in the novel mounting of the lenses in the box together with the novel means for adjusting the upper and lower lenses in relation to the central lens.

Other and further objects will be evident from an examination of the accompanying drawings when taken in connection with the following description.

Referring to the drawings in which similar reference numerals indicate corresponding parts.

Figure 1 is a sectional elevation of the front part of a moving picture camera showing the manner of mounting the telephoto lenses thereon.

Fig. 2 is a section on line 2—2 of Fig. 1, looking in the direction of the arrows.

Fig. 3 is an enlarged sectional view of the adjusting mechanism shown in Fig. 2.

Fig. 4 is a side view of the same.

Figs. 5, 6, and 7 are detail views of the adjusting mechanism for the upper and lower lenses.

Fig. 8 is a detail view of a fragment of the film.

Fig. 9 is a diagrammatic view showing the angle of divergence of the axial pencils of rays beyond the principal plane (*a*) when focused by three ordinary positive lenses, vertically superimposed, and (*b*) the angle of divergence beyond the same object, or principal plane when focused by three telephoto lenses, vertically superimposed, at eight magnifications, and Fig. 10 is a diagrammatic view showing the angle of divergence, beyond the principal plane, of outer pencils of rays of optical cone (*a*) when focused by three ordinary positive lenses, vertically superimposed, and (*b*) the angle of divergence beyond the same object when focused by three telephoto lenses, vertically superimposed, at eight magnifications.

In explanation of the foregoing diagrams, it must be stated that the battery of three ordinary positive lenses superimposed with a distance of one inch between their focal axes and placed twelve feet from a principal plane or object, will diverge one inch at a depth of field beyond the principal plane of twelve feet but the same object placed at a distance of ninety-six feet and brought to the original distance of twelve feet by the telephoto lenses set at eight magnifications will require a depth of field beyond the principal plane of ninety-six feet to cause the same divergence of one inch.

Experience has shown that in taking motion-pictures a depth of field in sharp focus of even a third of that distance does not bring artistic results as it has a tendency to flatten the principal objects in the foreground, and play up too strongly the distant objects and background. This is true when operating with the ordinary positive lenses and still more true when operating with the telephoto lenses. And since it is well recognized in photography that a diffusion of the more distant objects will aid perspective, so in the practical application of the present apparatus, the slight divergence obtained beyond the principal plane, such as illustrated in Figs. 9 and 10, will work to the advantage of the picture for the reason that when working at eight magnifications, an object that is ninety-six feet from the lenses is brought to a distance of twelve feet therefrom, while an object one hundred and eight feet from the lenses is not brought to its natural position of twelve feet back of the first object, or twenty-four feet from the lenses, but is brought to a distance of approximately thirteen and one third feet from the lens or only one foot and four inches back of the first object.

In operating with a single telephoto lens, this distortion of perspective is pronounced enough to cause a decided flattening of the picture and this always has been the chief objection to its use in motion picture work. But with my improved apparatus, since the three pictures are arranged in a common plane (preferably superimposed with vertical axes) the divergence in that plane is eliminated and there remains only the slight progressive divergence of lines beyond the object or principal plane, of that plane at right angles to the common plane or the plane in which the lenses are arranged. And this parallax effect is just sufficient to slightly diffuse in progressive ratio the more distant objects and background and correct this faulty perspective.

Referring now to the camera itself, Fig. 1 of the drawing shows the front 1 of a motion picture camera, provided with three suitably shaped apertures for the reception of the lower, central and upper telephoto lenses 2, 3, and 4 respectively, which are of the usual construction and which are provided with the usual lens adjustments. Surrounding these lenses and preferably secured in any suitable manner to the inside wall of the camera box, is a cuff 5 of flexible plilable material, adapted to prevent the flow of light thereto. Inasmuch as the middle lens 3 is not adjustable the same may be permanently fastened to the front of the box, as shown in Fig. 2, whereas the lower and upper lenses 2 and 4 are provided with means permitting their adjustment to and from the middle lens. And one form of such a means consists of the fragmentary collars 6 providing flanges into which freely project coöperating flanges 7 on the lower and upper peripheries of the lenses 2 and 4 respectively.

Within the camera and fastened thereto is the bracket member 8, preferably a casting, having the intermediate portion 9' comprising three square or oblong extensions registering with the like-shaped rearmost portions of the telephoto tubes 2, 3, and 4 and provided with slits 10 to receive the usual ray filters. The casting is also provided at 2' and 4' with pivots about which the lower and upper rearmost ends of the corresponding telephoto tubes are adapted to swing for their adjustments to and from the central tube. The aperture plate is indicated in Fig. 1 at 10.

As shown at 9, the lower and upper tubes are provided with refracting prisms to bring the outer image into the camera parallel with the central image. The shutter, which is of usual construction, is indicated by dotted lines 11, while the film is shown in detail in Fig. 8, and indicated in Fig. 1 by the letter F, as passing horizontally across the battery of lenses.

The means for giving the outer telephoto tubes their adjustment to and from the central lens consists of two sets of devices only one of which will be described inasmuch as they are identical.

Made fast to the upper and middle tubes in any suitable way are the two flanged guides 12 and 13 respectively of the shape shown in Figs. 5 and 7 and provided with flanged ways 14 and 15 respectively, which are adapted to slidingly receive corresponding flanges on the central H-shaped adjusting wedge 17 provided with bearing 18 for the shaft 20. One of the upper faces of the guide 13 is provided with a rack portion 16 with which meshes the pinion 19 on the shaft 20, so that as the latter is turned the wedge is moved in relation to the guides 12 and 13 imparting a vertical adjustment to the lower or upper pivoted telephoto tubes 2 and 4 depending upon which shaft 20 is rotated.

It is to be understood that the principles of my invention are not confined to the exact number of lenses provided a plurality are used, but that various changes may be made in the invention without departing from the spirit as set forth in the appended claims.

Having thus described my invention, what I claim as new and desire to secure by Letters Patent is:

1. In combination with a camera, an objective arrangement therefor consisting of three telephoto lenses superimposed in a vertical plane.

2. In combination with a camera, an objective arrangement therefor consisting of a plurality of telephoto lenses each adapted to produce a separate negative and means for adjusting the lenses relative to each other.

3. In combination with a camera, an objective arrangement therefor consisting of three telephoto lenses superimposed iln a vertical plane and means for adjusting the two outer lenses relatively to the central lens.

4. In a motion picture camera, an objective arrangement therefor consisting of a plurality of telephoto lenses the axes of the lenses arranged in a common plane each adapted to produce a separate negative.

5. In a motion picture camera, an objective arrangement therefor comprising a plurality of vertically superimposed telephoto lenses and means to relatively adjust the same.

6. In a motion picture camera, an objective arrangement therefor consisting of three vertically superimposed telephoto lenses and means adapted to adjust the outer lenses relatively to the central lens, said means including a sliding wedge arranged between the central and outer lenses.

7. In a motion picture camera for color photography, means including a plurality of telephoto lenses arranged in a common plane for producing a plurality of negatives upon a single film, said negatives covering identical fields both at the point of the principal plane and in perspective to all practical purpose in color photography.

In testimony whereof I affix my signature in the presence of two witnesses.

ORANGE J. COOPER.

Witnesses:
 JOHN C. BROWNELL,
 FRED E. COOPER.